(12) United States Patent
Oldfeldt et al.

(10) Patent No.: US 12,386,024 B2
(45) Date of Patent: Aug. 12, 2025

(54) SYSTEM AND METHOD FOR DETERMINING A DISTANCE BETWEEN NETWORKED ELECTRONIC DEVICES EACH COMPRISING A LOUDSPEAKER AND A MICROPHONE

(71) Applicant: Axis AB, Lund (SE)

(72) Inventors: Gillis Oldfeldt, Lund (SE); Frida Johnsson, Lund (SE)

(73) Assignee: AXIS AB, Lund (SE)

( * ) Notice: Subject to any disclaimer, the term of this patent is extended or adjusted under 35 U.S.C. 154(b) by 182 days.

(21) Appl. No.: 18/481,562

(22) Filed: Oct. 5, 2023

(65) Prior Publication Data

US 2024/0133998 A1 Apr. 25, 2024

(30) Foreign Application Priority Data

Oct. 13, 2022 (EP) ..................................... 22201258

(51) Int. Cl.
*G01S 5/18* (2006.01)

(52) U.S. Cl.
CPC ..................... *G01S 5/18* (2013.01)

(58) Field of Classification Search
CPC ........ G01S 5/18; G01S 7/52004; G01S 7/539; G01S 15/36; G01S 7/003; G01S 15/74; G01S 11/14
See application file for complete search history.

(56) References Cited

U.S. PATENT DOCUMENTS

| | | | |
|---|---|---|---|
| 3,078,460 A * | 2/1963 | Hose | G01S 13/84 342/127 |
| 4,219,885 A | 8/1980 | Routh et al. | |
| 9,689,958 B1 | 6/2017 | Wild et al. | |
| 2014/0179432 A1 | 6/2014 | Cohen et al. | |
| 2019/0011545 A1 | 1/2019 | Sundaresan et al. | |

(Continued)

FOREIGN PATENT DOCUMENTS

| | | | | |
|---|---|---|---|---|
| CN | 117890897 A | * | 4/2024 | ............. G01S 15/74 |
| CN | 117896427 A | * | 4/2024 | ............... G01S 5/18 |

(Continued)

OTHER PUBLICATIONS

European Search Report issued on Mar. 15, 2023 for European Patent Application No. 22201258.5.

*Primary Examiner* — Daniel Pihulic
(74) *Attorney, Agent, or Firm* — Volpe Koenig

(57) ABSTRACT

A system determines a distance between networked electronic devices. A first sound signal comprising a first measuring wave having a first frequency carried on a first carrier wave having a first carrier frequency higher than the first frequency is emitted by a first device. A second device receives the first sound signal, and defines a second sound signal comprising a second measuring wave having the first frequency carried on a second carrier wave having a second carrier frequency different from the first carrier frequency. A phase of the second measuring wave is set such that it simulates a reflection of the first measuring wave on the second device. The second sound signal is emitted by the second device and received by the first device. The distance between the first and second devices is calculated based on a phase shift between the emitted first, and received second measuring waves.

8 Claims, 3 Drawing Sheets

(56) References Cited

U.S. PATENT DOCUMENTS

| | | |
|---|---|---|
| 2019/0369236 A1 | 12/2019 | Rusconi Clerici Beltrami et al. |
| 2024/0129196 A1* | 4/2024 | Rosell ........................ G01S 5/18 |
| 2024/0133998 A1* | 4/2024 | Oldfeldt .................... G01S 5/18 |

FOREIGN PATENT DOCUMENTS

| | | | | |
|---|---|---|---|---|
| EP | 4354179 A1 * | 4/2024 | ............. | G01S 15/74 |
| EP | 4354817 A1 * | 4/2024 | ............... | G01S 5/18 |
| JP | 2024058610 A * | 4/2024 | ............... | G01S 5/18 |
| JP | 2024058611 A * | 4/2024 | ............. | G01S 15/74 |

\* cited by examiner

SYSTEM AND METHOD FOR DETERMINING A DISTANCE BETWEEN NETWORKED ELECTRONIC DEVICES EACH COMPRISING A LOUDSPEAKER AND A MICROPHONE

TECHNICAL FIELD

The present invention relates to determining a distance between networked electronic devices. Especially, it relates to determining such a distance using properties of sound emitted and received by the networked electronic devices using loudspeakers and microphones of the networked electronic devices.

BACKGROUND

In many applications there is a need to determine a distance between a first device and a second device. It is, e.g., known to perform distance measurements using different methods such as using a tape-measure, a laser-based range finder, or a sonar. The different methods have their pros and cons.

The inventors of the present invention have realized that there is a need for an additional method of determining a distance between a first device and a second device, especially for the case of determining a distance between devices of a system of devices mounted in a building.

SUMMARY OF THE INVENTION

In view of the above, it is an object of the present invention to provide a method of determining a distance between a first device and a second device.

According to a first aspect a method for determining a distance between a first networked electronic device and a second networked electronic device is provided. The first networked electronic device has a first loudspeaker and a first microphone. The second networked electronic device has a second loudspeaker and a second microphone. The method comprises emitting, using the first loudspeaker, a first sound signal. The first sound signal comprises a first measuring wave having a first frequency carried on a first carrier wave having a first carrier frequency. The first carrier frequency is higher than the first frequency. The method further comprises receiving, using the second microphone, the first sound signal. The method further comprises defining, at the second electronic device, a second sound signal. The second sound signal comprises a second measuring wave carried on a second carrier wave. The second measuring wave has the same frequency as the first measuring wave. Hence, the second measuring wave has the first frequency. The second carrier wave has a second carrier frequency different from the first carrier frequency. A phase of the second measuring wave is set such that it simulates a reflection of the first measuring wave on the second networked electronic device. The method further comprises emitting, using the second loudspeaker, the second sound signal. The method further comprises receiving, using the first microphone, the second sound signal. The method further comprises calculating the distance between the first networked electronic device and the second networked electronic device based on a phase shift between the emitted first measuring wave and the received second measuring wave.

In line with the above, the inventors have realized that by using properties of sound, a distance between two devices each equipped with a loudspeaker and a microphone can be determined. This by looking at a phase shift of a low frequency periodic measuring wave carried on a sound-based carrier wave. The low frequency periodic measuring wave might even be below 20 Hz. In order to determine distances in the range of 1 m to 50 m the frequency of the measuring wave needs to be 3-160 Hz. That since the wavelength of the measuring wave needs to be longer than half the distance between the two devices. Most loudspeakers cannot reproduce waves having such low frequencies. By using a carrier wave emitting a measuring wave having as low frequency as discussed above is provided for.

The first and second carrier waves may have a carrier frequency in a range of 200-20 000 Hz.

Defining the second sound signal may comprise setting the phase of the second measuring wave to be same as a phase of the first measuring wave of the by the second microphone received first sound signal.

Setting the phase of the second measuring wave may comprises determining the phase of the second measuring wave based on a processing time of a circuitry at the second networked electronic device analyzing the first sound signal in order to determine the phase of the received first measuring wave.

Defining and emitting the second sound signal may comprise emitting a candidate second sound signal; shifting, while listening with the second microphone, the phase of the second measuring wave of the candidate second sound signal until the phases of the received first measuring wave and the second measuring wave of the candidate second sound signal match up; and upon the phases of the received first measuring wave and the second measuring wave of the candidate second sound signal matching up, emitting the second sound signal as having the matched-up phase.

According to a second aspect a system for determining a distance between a first networked electronic device and a second networked electronic device is provided. The system comprises: the first networked electronic device having a first loudspeaker and a first microphone; and the second networked electronic device having a second loudspeaker and a second microphone. The first networked electronic device further comprises first circuitry configured to: define a first sound signal comprising a first measuring wave having a first frequency carried on a first carrier wave having a first carrier frequency being higher than the first frequency; and drive the first loudspeaker to emit the first sound signal. The second networked electronic device further comprises second circuitry configured to: analyze the first sound signal upon its registration by the second microphone; define a second sound signal comprising a second measuring wave having the first frequency carried on a second carrier wave having a second carrier frequency being higher than the first frequency and different from the first carrier frequency, wherein a phase of the second measuring wave is set such that it simulates a reflection of the first measuring wave of the first sound signal on the second networked electronic device; and drive the second loudspeaker to emit the second sound signal. The first circuitry of the first networked electronic device is further configured to: analyze the second sound signal upon its registration by the first microphone; determine a phase shift between the emitted first measuring wave and the received second measuring wave; and calculate the distance between the first networked electronic device and the second networked electronic device based on the determined phase shift.

The above-mentioned features of the method, when applicable, apply to this second aspect as well. In order to avoid undue repetition, reference is made to the above.

A further scope of applicability will become apparent from the detailed description given below. However, it should be understood that the detailed description and specific examples are given by way of illustration only.

It is to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
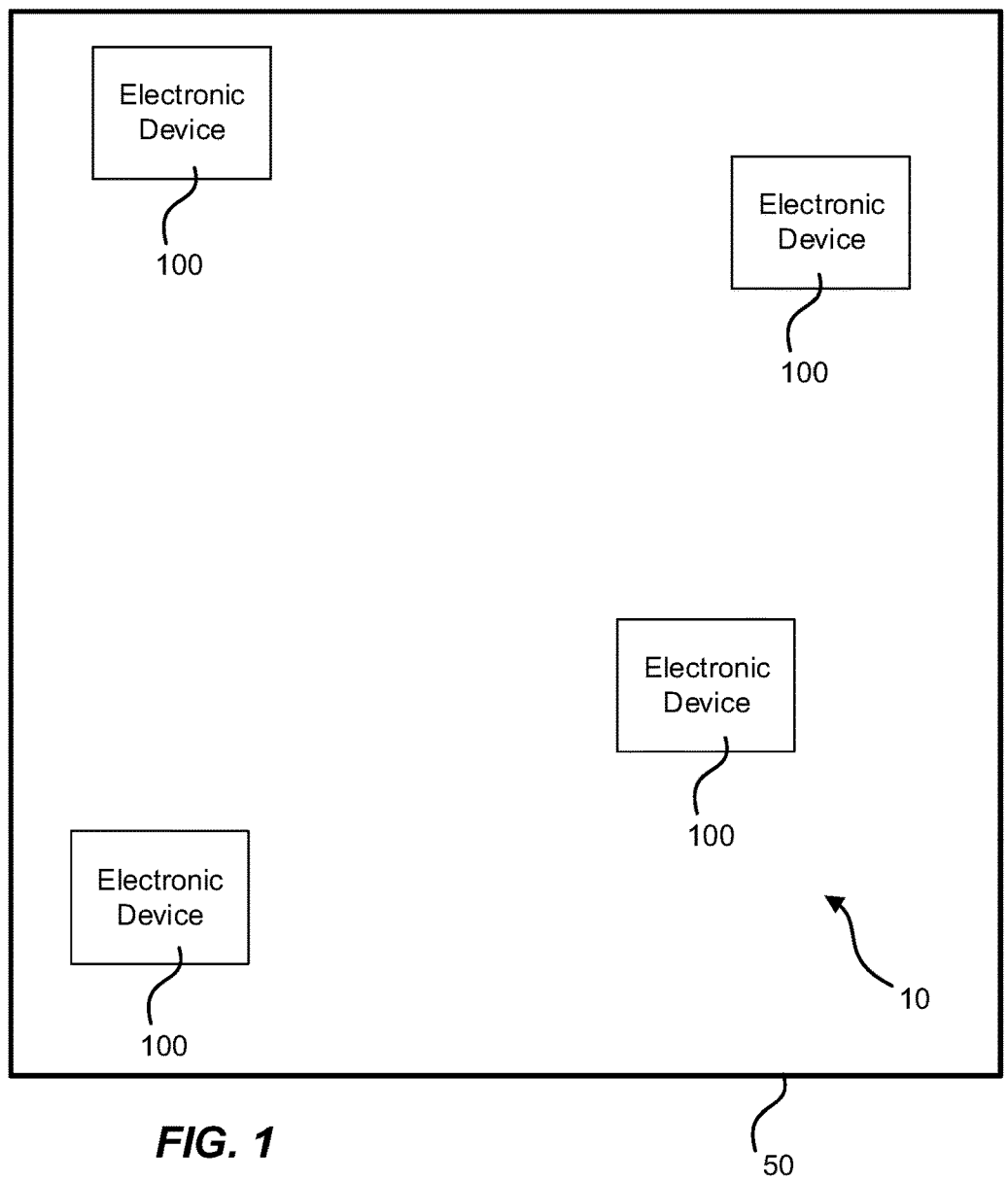
FIG. 1 schematically illustrates a system of networked electronic devices mounted in a building.
Figure 2:
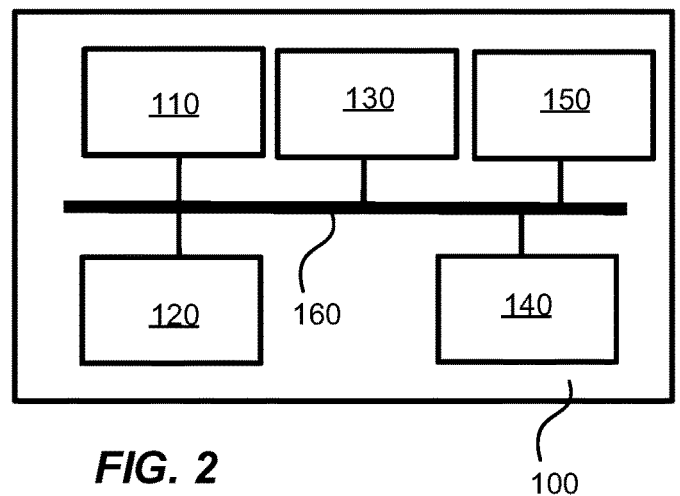
FIG. 2 schematically illustrates a networked electronic device.

FIG. 1 illustrates a system 10 of networked electronic devices 100 mounted in a building 50. Such a networked electronic device is schematically illustrated in FIG. 2. Each networked electronic device 100 has a loudspeaker 110 and a microphone 120. Examples of such networked electronic devices 100 are networked loudspeakers, networked monitoring cameras and/or networked access control devices. In addition to the loudspeaker 110 and a microphone 120, the networked electronic device 100 may comprise circuitry 130, a memory 140 and a communication module 150. The communication module 150 is configured to send and/or receive data via a communication network to which the networked electronic device 100 is connected. The circuitry 130 is configured to carry out overall control of functions and operations of the networked electronic device 100. The circuitry 130 may include a processor, such as a central processing unit (CPU), microcontroller, or microprocessor. The processor is configured to execute program code stored in the memory 140, in order to carry out functions and operations of the networked electronic device 100. The memory 140 may be one or more of a buffer, a flash memory, a hard drive, a removable medium, a volatile memory, a non-volatile memory, a random access memory (RAM), or another suitable device. In a typical arrangement, the memory 140 may include a non-volatile memory for long term data storage and a volatile memory that functions as system memory for the networked electronic device 100. The memory 140 may exchange data with the circuitry 130, the loudspeaker 110, the microphone 120 and/or the communication module 150 over a data bus 160. Functions and operations of the networked electronic device 100 may be embodied in the form of executable logic routines (e.g., lines of code, software programs, etc.) that are stored on a non-transitory computer readable medium (e.g., the memory 140) of the networked electronic device 100 and are executed by the circuitry 130 (e.g., using the processor). Furthermore, the functions and operations of the networked electronic device 100 may be a stand-alone software application or form a part of a software application that carries out additional tasks related to the networked electronic device 100. The functions and operations may be considered a method that the networked electronic device 100 is configured to carry out. Also, while the functions and operations may be implemented in software, such functionality may as well be carried out via dedicated hardware or firmware, or some combination of hardware, firmware and/or software.

For some applications, such as during commissioning of the system 10 of networked electronic devices 100, distances between the different networked electronic devices 100 are to be determined. Various methods for determining distance exist as of today, e.g., tape-measure, a laser-based range finder, or a sonar. However, none of them are optimal for determining a distance between two networked electronic devises 100 being mounted in a building 50.

Figure 3:
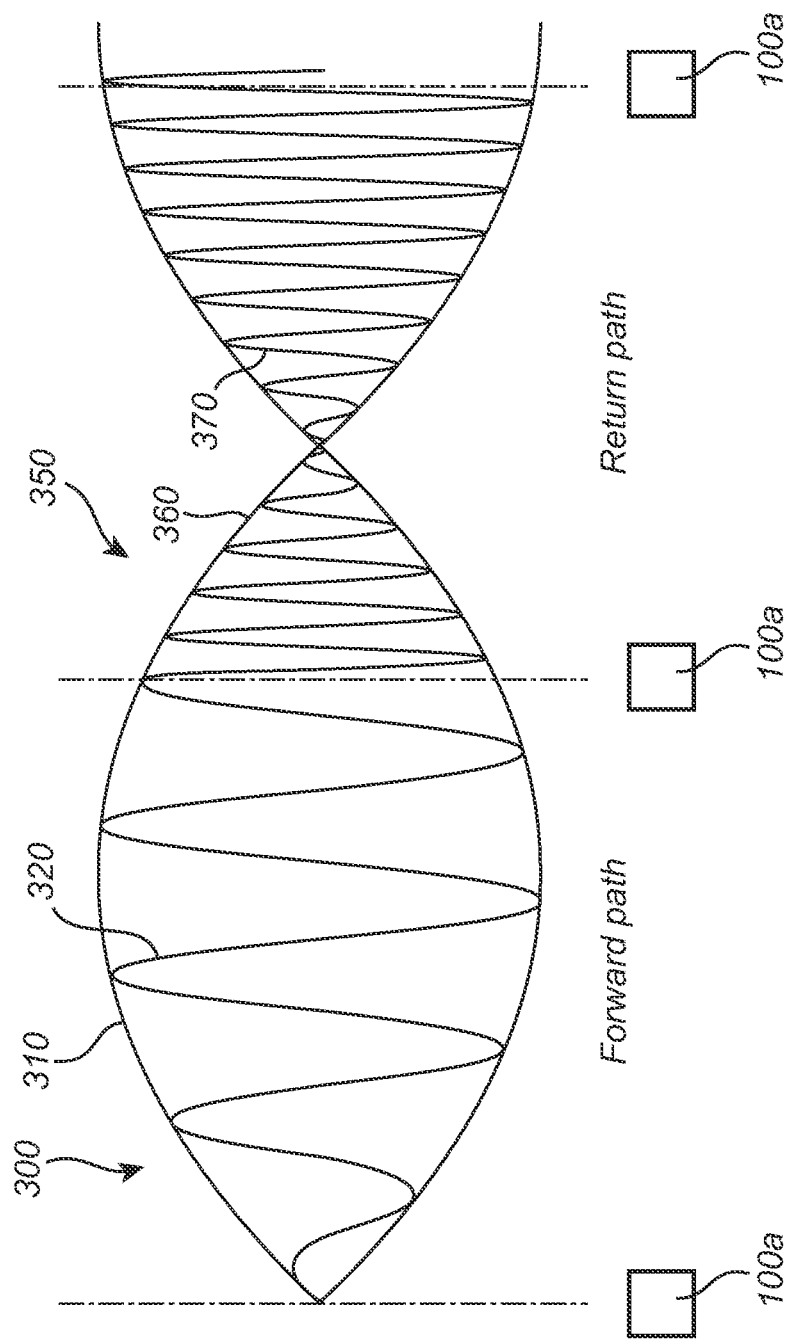
FIG. 3 schematically illustrates a method of using properties of sound for determining a distance between two networked electronic devices.
Figure 4:
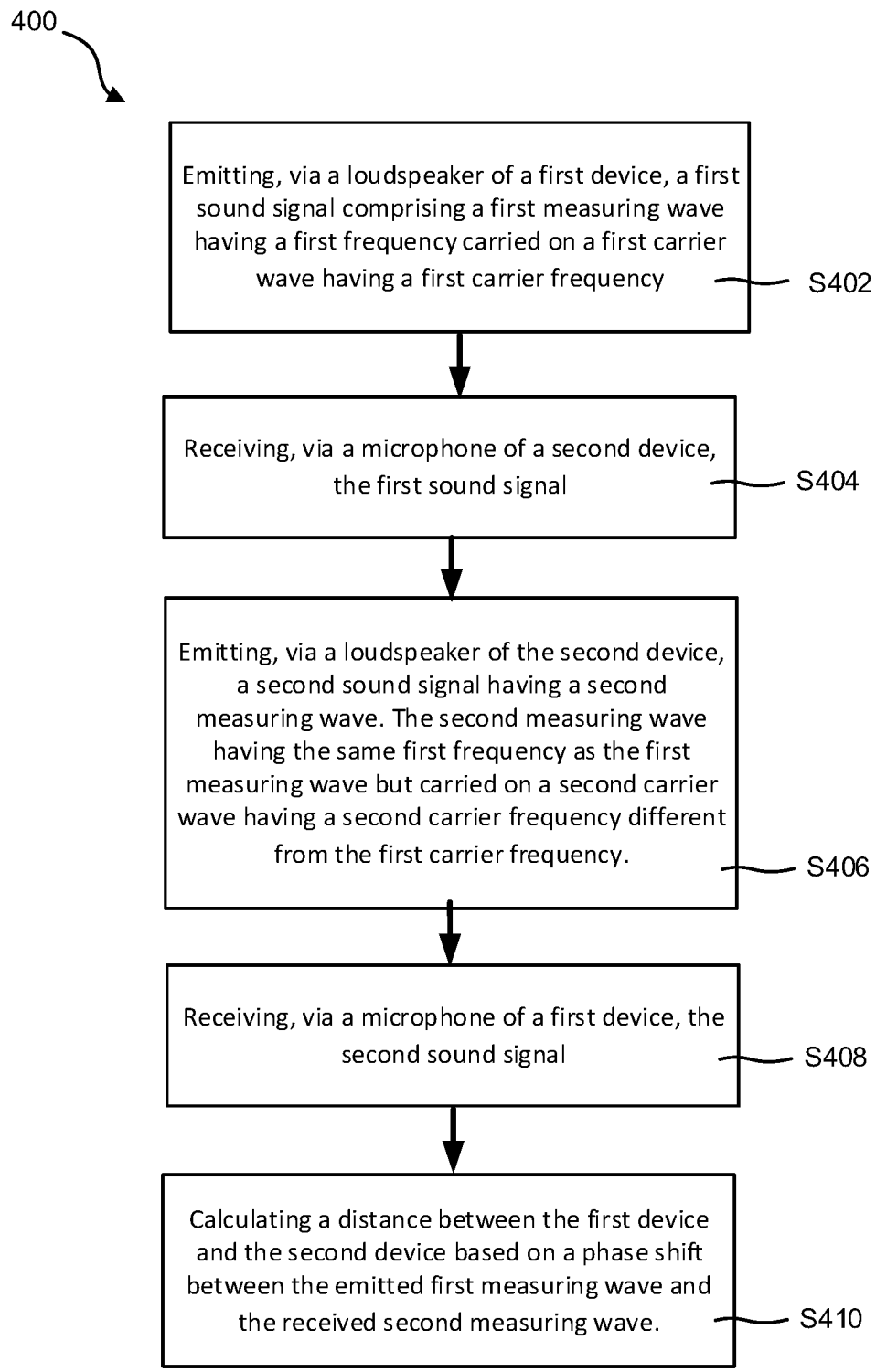
FIG. 4 is a block diagram of a method for determining a distance between the first electronic device and the second electronic device.

The inventors of the present invention have realized that properties of sound can be used in determining a distance between two networked electronic devices 100a, 100b each equipped with a loudspeaker and a microphone. This will now be discussed in connection with FIGS. 3 and 4. FIG. 3 schematically illustrates using properties of sound for determining a distance between two networked electronic devices 100a, 100b and FIG. 4 is a block diagram of a method for determining a distance between the first electronic device 100a and the second electronic device 100b.

A first networked electronic devices 100a is instructed to emit S402, via its loudspeaker, a first sound signal 300 comprising a first measuring wave 310 having a first frequency carried on a first carrier wave 320 having a first carrier frequency. The first sound signal 300 is illustrated along the "Forward path" in FIG. 3.

A second networked electronic device 100b, within earshot of the first sound signal 300, is set to, via its microphone, listen to the first sound signal 300. Hence, the second networked electronic device 100b is set to receive S404 the first sound signal.

Upon receipt of the first sound signal 300, the second networked electronic device 100b is set to, via its loudspeaker, emit S406 a second sound signal 350 having a second measuring wave 360. The second measuring wave 360 has the same first frequency as the first measuring wave 310 but carried on a second carrier wave 370 having a second carrier frequency different from the first carrier frequency. The second sound signal 350 is illustrated along the "Return path" in FIG. 3. By using the second carrier frequency different from the first carrier frequency the second sound signal 350 may be differentiated from echoes of the first sound signal 300 from other structures.

Further, the second networked electronic device 100b is set to shift a phase of the second measuring wave 360 so that it simulates a reflection of the first measuring wave 310 on the second networked electronic device 100b. That is, the phase of the second measuring wave 360 is to be set to be same as a phase of the first measuring wave 320 at the second networked electronic device 100b. Hence, the second networked electronic device 100b is set to define the second sound signal 350 such that a phase of the second measuring wave 360 is set such that it simulates a reflection of the first measuring wave 310 on the second networked electronic device 100b. The second sound signal 350 may be defined using circuitry of the second networked electronic device 100b. Hence, the second networked electronic device 100b is set to answer with a second sound signal 350 comprising a second measuring wave 360 having the same phase as the first measuring wave 310 of the incoming first sound signal 300. That is, the second networked electronic device 100b is set to simulate a reflection of the first measuring wave 310. However, in order to distinguish the simulated reflection from real reflections on other structures, the second networked electronic device 100b is set to carry the second measuring wave 360 on a second carrier wave 370 having a carrier frequency different from the carrier frequency of the first sound signal 300. In other words, defining the second sound signal 350 comprises setting the phase of the second measuring wave 360 to be same as a phase of the first measuring wave 310 of the by the second microphone of the second networked electronic device 100b received first sound signal 300. Setting the phase of the second measuring wave 360 may comprise determining the phase of the second measuring wave 360 based on a processing time of a circuitry at the second networked electronic device 100b analyzing the first sound signal 300 in order to determine the phase of the received first measuring wave 310. Doing so the phase of the second measuring wave 360 can be timed with the phase of the received first measuring wave 310. Alternatively, or in combination, defining and emitting the second sound signal 350 may comprise: i) emitting a candidate second sound signal, ii) shifting, while listening with the second microphone of the second networked electronic device 100b, the phase of the second measuring wave of the candidate second sound signal until the phases of the received first measuring wave 310 and the second measuring wave of the candidate second sound signal match up, and iii) upon the phases of the received first measuring wave 310 and the second measuring wave of the candidate second sound signal matching up, emitting the second sound signal 350 as having the matched-up phase.

The first networked electronic device 100a is then set to, via its microphone 120a, listen to the second sound signal 350. Hence, the first networked electronic device 100a is set to receive S408 the second sound signal.

A distance between the first networked electronic device 100a and the second networked electronic device 100b can then be determined based on a phase shift between the, at the first networked electronic device 100a, emitted first measuring wave 310 and the, at the first networked electronic device 100a, received second measuring wave 360. This since such a phase shift will depend on the distance between the first and second networked electronic devices 100a, 100b. The distance, D, between the first and second networked electronic devices 100a, 100b can be expressed as:

$$D = \frac{\Delta \Phi}{\pi} \cdot \lambda$$

where $\Delta \Phi$ is the phase shift [expressed in radians] and $\lambda$ is the wavelength of the measuring wave defined as:

$$\lambda = \frac{\text{speed of sound}}{f}$$

where f is the frequency of the measuring waves 310, 360, i.e., the first frequency discussed above. This under the assumption that the distance between the first and second networked electronic devices 100a, 100b is within half a wavelength. Hence, the distance D between the first networked electronic device 100a and the second networked electronic device 100b is calculated S410 based on a phase shift between the emitted first measuring wave 310 and the received second measuring wave 360. The calculating S410 is preferably made by circuitry of the first networked electronic device 100a. However, the calculating S410 can be made at any other device having computational capabilities and being connected to the first networked electronic device 100a so that the phase shift or information for calculating the phase shift may be communicated thereto.

Assuming the workable range for the distance one would want to measure is between 1 m and 50 m, then the first frequency should be in the range of 160 Hz and 3.3 Hz. The frequency for the first and second carrier waves 320, 370 shall be higher than the first frequency, hence typically above 200 Hz. An upper limit for the frequency of the first and second carrier waves 320, 370 is typically 20 000 Hz. As mentioned above, the first and second carrier waves 320, 370 are set to have different carrier frequencies. By using different carrier frequencies for the different carrier waves 320, 370 the second sound signal 350 may be differentiated from echoes of the first sound signal 300 from other structures in the building. Further, an identity of the networked electronic devices 100 can be encoded by assigning a specific carrier frequency to a specific networked electronic device. Typically, the first and second sound signals 300, 350 are sinusoidal amplitude modulated signals. However, any periodic signal that can be carried by a carrier wave would work.

The person skilled in the art realizes that the present invention by no means is limited to what is explicitly described above. On the contrary, many modifications and variations are possible within the scope of the appended claims.

For example, in some applications both the first and the second networked electronic devices are fixedly mounted in the building. In other applications the first electronic device may be a portable electronic device, such as a mobile phone.

Additionally, variations can be understood and effected by the skilled person in practicing the claimed invention, from a study of the drawings, the disclosure, and the appended claims.

The invention claimed is:

1. A method for determining a distance between a first networked electronic device having a first loudspeaker and a first microphone and a second networked electronic device having a second loudspeaker and a second microphone, the method comprising:

emitting, using the first loudspeaker, a first sound signal comprising a first measuring wave having a first frequency carried on a first carrier wave having a first carrier frequency being higher than the first frequency, wherein the first sound signal is sinusoidal amplitude modulated;

receiving, using the second microphone, the first sound signal;

defining, at the second electronic device, a second sound signal comprising a second measuring wave having the first frequency carried on a second carrier wave having a second carrier frequency different from the first carrier frequency, wherein the second sound signal is sinusoidal amplitude modulated and wherein defining the second sound signal comprises setting the phase of the second measuring wave to be the same as a phase of the first measuring wave of the first sound signal received by the second microphone thereby a phase of the second measuring wave is set such that it simulates a reflection of the first measuring wave on the second networked electronic device;

emitting, using the second loudspeaker, the second sound signal;

receiving, using the first microphone, the second sound signal; and calculating the distance between the first networked electronic device and the second networked electronic device based on a phase shift between the emitted first measuring wave and the received second measuring wave.

2. The method according to claim 1, wherein the first frequency of the first and second measuring waves is in a range of 3-160 Hz.

3. The method according to claim 1, wherein the first and second carrier waves have a carrier frequency in a range of 200-20,000 Hz.

4. The method according to claim 1, wherein setting the phase of the second measuring wave comprises determining the phase of the second measuring wave based on a processing time of a circuitry at the second networked electronic device analyzing the first sound signal in order to determine the phase of the received first measuring wave.

5. The method according to claim 1, wherein defining and emitting the second sound signal comprises:
emitting a candidate second sound signal,
shifting, while listening with the second microphone, the phase of the second measuring wave of the candidate second sound signal until the phases of the received first measuring wave and the second measuring wave of the candidate second sound signal match, and
upon the phases of the received first measuring wave and the second measuring wave of the candidate second sound signal matching, emitting the second sound signal as having the matched phase.

6. A system for determining a distance between a first networked electronic device and a second networked electronic device, the system comprising:
the first networked electronic device having a first loudspeaker and a first microphone; and
the second networked electronic device having a second loudspeaker and a second microphone,
wherein the first networked electronic device further comprises first circuitry configured to:
define a first sound signal comprising a first measuring wave having a first frequency carried on a first carrier wave having a first carrier frequency being higher than the first frequency, wherein the first sound signal is sinusoidal amplitude modulated, and
drive the first loudspeaker to emit the first sound signal;
wherein the second networked electronic device further comprises second circuitry configured to:
analyze the first sound signal upon its registration by the second microphone,
define a second sound signal comprising a second measuring wave having the first frequency carried on a second carrier wave having a second carrier frequency being higher than the first frequency and different from the first carrier frequency, wherein the second sound signal is sinusoidal amplitude modulated and wherein defining the second sound signal comprises setting the phase of the second measuring wave to be the same as a phase of the first measuring wave of the first sound signal received by the second microphone thereby a phase of the second measuring wave is set such that it simulates a reflection of the first measuring wave of the first sound signal on the second networked electronic device, and
drive the second loudspeaker to emit the second sound signal;
wherein the first circuitry of the first networked electronic device is further configured to:
analyze the second sound signal upon its registration by the first microphone,
determine a phase shift between the emitted first measuring wave and the received second measuring wave, and
calculate the distance between the first networked electronic device and the second networked electronic device based on the determined phase shift.

7. The system according to claim 6, wherein the first frequency of the first and second measuring waves is in a range of 3-160 Hz.

8. The system according to claim 6, wherein the first and second carrier waves have a carrier frequency in a range of 200-20,000 Hz.

* * * * *